Dec. 12, 1950 — L. S. WILLIAMS — 2,533,862
PENDULUM SCALE
Filed March 19, 1946 — 2 Sheets-Sheet 1
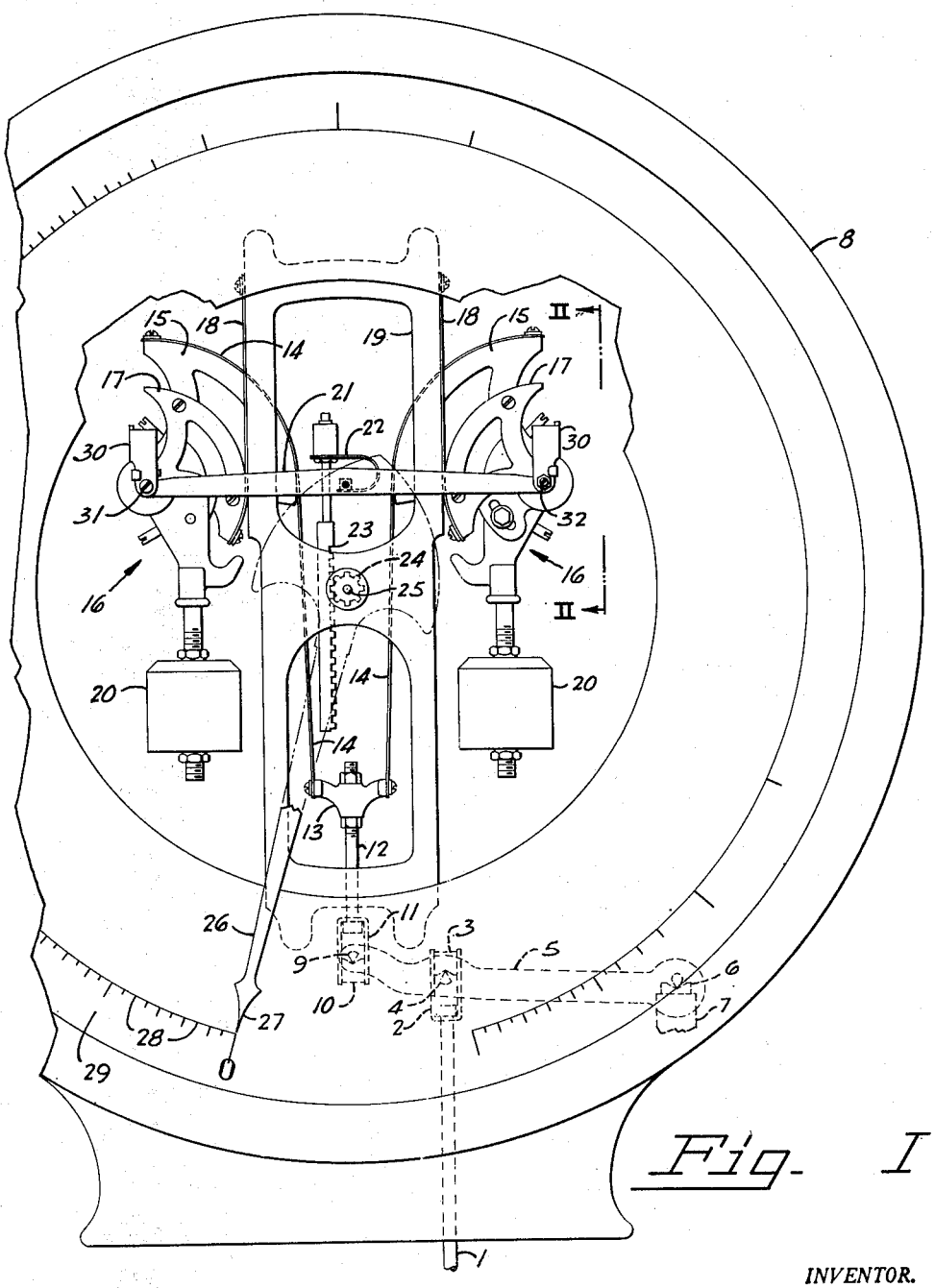
Fig. I
INVENTOR.
Lawrence S. Williams
BY
Marshall and Marshall
ATTORNEYS Dec. 12, 1950  L. S. WILLIAMS  2,533,862
PENDULUM SCALE
Filed March 19, 1946  2 Sheets-Sheet 2
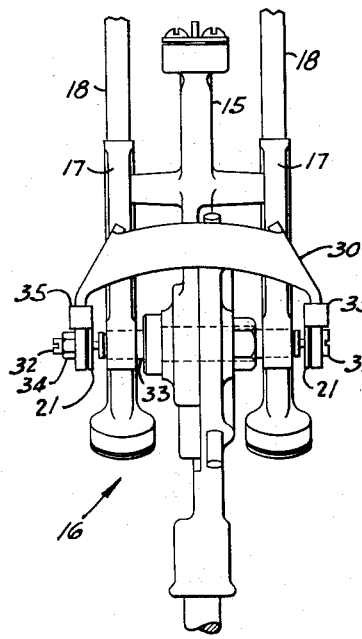
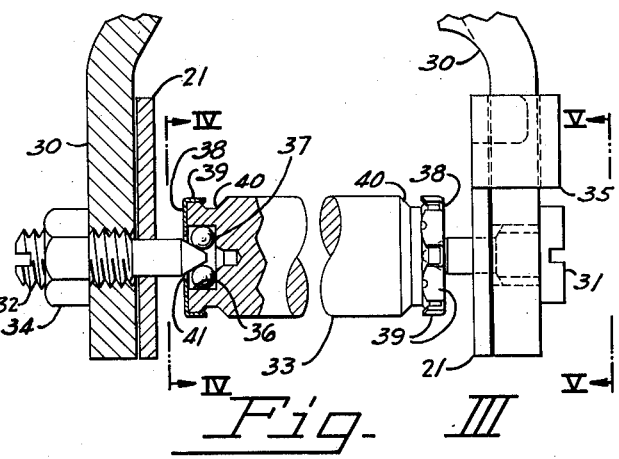
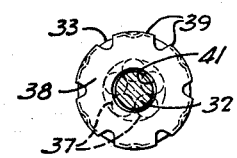
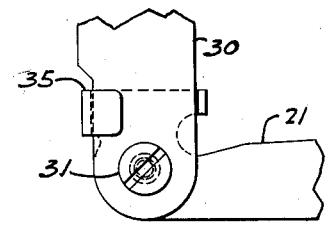
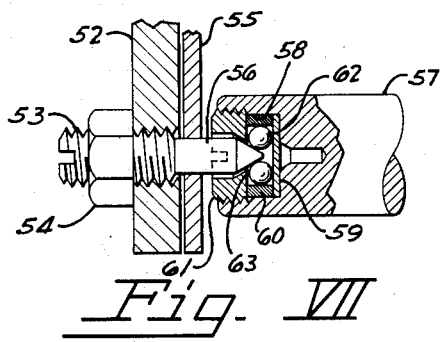
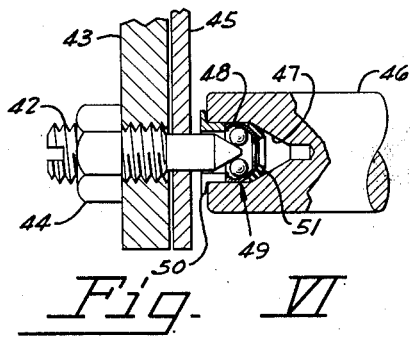
INVENTOR.
Lawrence S. Williams
BY
Marshall and Marshall
ATTORNEYS Patented Dec. 12, 1950

2,533,862

UNITED STATES PATENT OFFICE 2,533,862

PENDULUM SCALE

Lawrence S. Williams, Toledo, Ohio, assignor to Toledo Scale Company, Toledo, Ohio, a corporation of New Jersey Application March 19, 1946, Serial No. 655,413

1 Claim. (Cl. 265—62)

This invention relates to weighing scales and in particular to an improved means for pivotally supporting one portion of weighing scale mechanism from another portion.

The accuracy of automatic weighing scales has been increased through the development of better counterbalancing mechanisms and in the reduction of friction in the counterbalancing and indicating mechanisms. As the accuracy requirements of automatic weighing scales are made more exacting the importance of removing all traces of friction becomes much more apparent. Pin connections for dash pots, check links, and pendulum to indicator connections which had been considered as being satisfactory were found to have too much friction to permit their use in sensitive weighing scales.

Ball bearings have been used for carrying indicator shafts and in some cases for carrying the levers of a weighing scale. The usual objection to the use of ball bearings for reducing friction, was the cost and the complication in the structure required to satisfactorily mount them.

The principal object of this invention is to provide a simplified ball bearing assembly which provides the antifriction characteristics of a ball bearing without increasing the cost or complication of the weighing scale.

Another object of the invention is to provide a simple ball bearing assembly which may be constructed as an integral part of the weighing scale mechanism. A still further object of the invention is to provide a simple ball bearing assembly which presents a maximum load carrying capacity for a given outside diameter.

These and other objects and advantages are apparent from the following description in which reference is made to the accompanying drawings.

The improved bearing in its preferred form consists of a plurality of bearing balls contained within a counterbore in one of the members to be pivotally connected and a cone pointed screw supported in the other member with its conical surface contacting the bearing balls. If the member containing the counterbore can be hardened and the periphery of the counterbore can be ground, the balls may be carried directly in the counterbore and held therein by a spring clamp forming an annular guard across the mouth of the counterbore. However, if the member is soft it may be necessary to use a hardened liner between the balls and the wall of the counterbore.

A portion of a weighing scale mechanism containing the simplified ball bearing is illustrated in the accompanying drawings.

In the drawings:

Figure I is a front elevation of an automatic load counterbalancing and indicating mechanism of a weighing scale.

Figure II is an enlarged fragmentary side elevation of a portion of the weighing mechanism as seen from the line II—II of Figure I.

Figure III is an enlarged fragmentary detail, partly in section, of a portion of the mechanism shown in Figure II.

Figure IV is a vertical section as seen from the line IV—IV of Figure III.

Figure V is a fragmentary end elevation as seen from the line V—V of Figure III.

Figure VI is a fragmentary section of an alternative form of the improved ball bearing assembly.

Figure VII is a fragmentary section of another modification of the invention.

These specific figures and the accompanying description are intended merely to illustrate the invention and are not intended to impose limitations on the claim.

Load forces to be counterbalanced and indicated are transmitted from a load receiver through a lever mechanism, not shown, to a steelyard rod 1 suspended from a stirrup 2 containing a V-bearing 3 which rests on a load pivot 4 of a pendulum lever 5. The pendulum lever 5 is fulcrumed on a V-bearing 6 that is mounted in a bracket 7 secured to the interior of the rim of a substantially watchcase shaped housing 8.

The pendulum lever 5 has a power pivot 9 engaging a V-bearing 10 held in a stirrup 11 suspended from a short steelyard rod 12. A yoke 13 secured to the top of the short steelyard rod 12 is carried by a pair of steel ribbons 14 whose upper ends overlie and are secured to power sectors 15 of a pair of floating pendulum assemblies 16. Each pendulum assembly 16 has fulcrum sectors 17 attached to and arranged to roll up fulcrum ribbons 18 whose upper ends are attached to the sides of a generally rectangular elongated frame 19 secured in a vertical position in the watchcase shaped housing 8.

When the loads are applied through the pendulum lever 5 to the steel ribbons 14 they cause the pendulum assemblies 16 to roll upwardly along the sides of the frame 19 and to swing their counterbalance weights 20 upwardly and outwardly until the increased moment of the counter weights 20 counterbalances the load forces applied through the steel ribbons 14.

The average upward motion of the pendulum assemblies 16 is transmitted through compensating bars 21 and a shock absorbing spring 22 to a rack 23 which meshes with a pinion 24 secured to an indicator shaft 25. The movement so transmitted through the rack and pinion turns an indicator 26 through increments of angle that are directly proportional to increments of load applied to the load receiver. An index tip 27 of the indicator 26 cooperates with a series of indicia 28 printed or otherwise inscribed on an annular chart 29 mounted within the watchcase shaped housing 8.

The compensating bars 21 are carried at each end on compensating bar yokes 30. Cone pointed screws 31 and 32 threaded through the ends of the yoke 30 engage the ends of a sector shaft 33 of the pendulum assembly 16. The cone pointed screw 32 carries a locking nut 34 so that clearance between the screws and the ends of the sector shaft 33 may be adjusted.

The ends of the compensating bars 21 have ears 35 (see Figures III and V) which engage the sides of the legs of the yoke 30 to loosely hold it in an upright position.

In the preferred form of the invention each end of the sector shaft 33 is provided with a counterbore 36 in which a number of bearing balls 37 are located. The sides and bottom of the counterbore are hardened and ground to provide a raceway for the bearing balls 37. The balls 37, enough to fill the counterbore, are held in place by a spring slip 38 having formed fingers 39 adapted to snap into an annular groove 40 cut in the periphery of the sector shaft 33 adjacent its end. The cone pointed screws 31 and 32 are adjusted in the yoke 30 so that their cone points extend through holes 41 in the spring covers 38 and engage the bearing balls 37 on the conical portions of the screws. The cone points of the screws 31 and 32 are made with an included angle of approximately 60 degrees for convenience in manufacture and for securing substantial strength adjacent the ends of the screws. In the preferred embodiment of invention shown in Figures II, III, and IV, five bearing balls are placed in each of the counterbores. The space left in the center, the space usually occupied by the inner race of a ball bearing, is too small to admit a shaft whose diameter is even equal to the diameter of the balls. For this reason a cone point is used so that adequate strength is maintained in the screw right up to the point of contact with the balls.

A 60 degree angle for the cone point is much too steep to provide theoretically correct rolling action when the balls are confined in a counterbore whose bottom is perpendicular to the axis of the shaft and whose sides are parallel to the axis. However, the difference in performance between a cone having the theoretically correct angle and a 60 degree cone is negligible in so far as friction is concerned, because the balls may pivot on their points of contact with the cone at the same time as they roll around the cone. In a roller bearing where such a pivoting action is impossible, the cones must be precisely correct or the bearing will develop very high friction.

This preferred form of construction provides a very economical and simple antifriction bearing for use in a limited space.

Figure VI shows a modification which may be required in scales subjected to certain unusual operating conditions. In this example a cone pointed screw 42 is threaded through the end of a yoke 43 and is locked by a nut 44. A compensating bar 45 is carried on the cone pointed screw 42 closely adjacent the yoke 43. A sector shaft 46 has a stepped hole 47 drilled in its end to receive the thin outer race 48 of a ball bearing assembly 49. The bearing assembly 49 is held in the stepped hole 47 by a split retainer 50. The ball bearing assembly is backed up by a resilient cushion 51 so that when subjected to heavy loads it may compress the cushion 51 and thereby lower the end of the cone pointed screw 42 against the split retainer 50 and thus relieve the bearing balls and the cone point of excessive load. The normal clearance between the hole in the retainer 50 and the straight portion of the cone pointed screw 42 is made quite small so that little travel of the ball bearing race 48 against the resilient cushion 51 is required to unload or relieve the ball bearing of excessive load.

Another modification of the improved bearing is illustrated in Figure VII. In this example a compensating bar yoke 52 is threaded to receive a cone pointed screw 53 which is held in adjusted position by a locked nut 54. A compensating bar 55 is carried on a straight portion 56 of the screw 53. A sector shaft 57, in this example made of a grade of steel which cannot be satisfactorily hardened has a counterbore 58 cut in the end thereof. The bottom of the counterbore is lined with a thin hardened steel disk 59 which is held in place by a hardened steel liner 60 which in turn is secured in place by an annular threaded member 61 screwed into the end of the counterbore 58. The hardened steel disk 59 and the hardened steel liner 60 form the outer race for a plurality of bearing balls 62. An inwardly directed shoulder 63 of the annular threaded member 61 holds the balls in position without binding them against rolling action. The cone pointed end of the screw 53 extends through the annular threaded member 61 and rests on the bearing balls 62. This construction is similar to that shown in the first example except that the hardened steel liners are used in lieu of hardening the end of the sector shaft and grinding the inside surfaces of the counterbore. The annular threaded member 61 is a possible substitute for the spring clip 38, although it is more expensive to make.

The improved ball bearing assemblies shown in these examples provide an economical yet satisfactory method for overcoming friction between scale parts which are not subjected to unusually heavy loads.

Various modifications of the structure shown may be devised to meet the requirements of specific installations without departing from the scope of the invention.

Having described my invention, I claim:

In a pendulum for a weighing scale, in combination, a pendulum assembly having a first sector to which load force is applied, a second sector that engages ribbons by which the assembly is supported and an axle-like member extending laterally of the assembly, said axle-like member having a counterbore in each end concentric with respect to the center of the second sector and having a rim extending radially from each end of the member, a plurality of bearing balls contained in each counterbore, an apertured closure for each counterbore that is held in place by fingers engaging the radially extending rim, and a yoke supported on the pendulum assembly by inwardly directed conical points that engage the bearing balls in each counterbore, said yoke serving as a connection between the pendulum and load indicating mechanism.

LAWRENCE S. WILLIAMS.

REFERENCES CITED

The following references are of record in the file of this patent:

UNITED STATES PATENTS

| Number | Name | Date |
|---|---|---|
| 516,627 | Bryant | Mar. 13, 1894 |
| 703,020 | Thompson | June 24, 1902 |
| 809,280 | Broomall | Jan. 9, 1906 |
| 2,199,024 | Carter et al. | Apr. 30, 1940 |
| 2,350,321 | Bennett | June 6, 1944 |
| 2,387,202 | Williams | Oct. 16, 1945 |